United States Patent
Boyd et al.

(10) Patent No.: US 10,150,555 B2
(45) Date of Patent: Dec. 11, 2018

(54) ELASTOMERIC GEL BODY GASKET HAVING A SUBSTANTIALLY INCOMPRESSIBLE SKELETON, A METHOD OF MAKING AND USING THE SAME

(71) Applicant: Aviation Devices & Electronic Components, LLC, Fort Worth, TX (US)

(72) Inventors: Matt Boyd, Fort Worth, TX (US); Jeff Busby, Millsap, TX (US); Kent Boomer, Aledo, TX (US); Michael Dry, Fort Worth, TX (US)

(73) Assignee: THE PATENT WELL, LLC, Fort Worth, TX (US)

( * ) Notice: Subject to any disclaimer, the term of this patent is extended or adjusted under 35 U.S.C. 154(b) by 1126 days.

(21) Appl. No.: 14/484,570

(22) Filed: Sep. 12, 2014

(65) Prior Publication Data

US 2015/0069722 A1    Mar. 12, 2015

Related U.S. Application Data

(60) Provisional application No. 61/876,849, filed on Sep. 12, 2013.

(51) Int. Cl.
| | | |
|---|---|---|
| *F16J 15/08* | (2006.01) | |
| *B64C 1/36* | (2006.01) | |
| *F16J 15/02* | (2006.01) | |
| *B64C 1/14* | (2006.01) | |

(Continued)

(52) U.S. Cl.
CPC .............. *B64C 1/36* (2013.01); *B64C 1/1461* (2013.01); *B64C 1/18* (2013.01); *F16J 15/022* (2013.01); *F16J 15/104* (2013.01)

(58) Field of Classification Search
CPC .. B64C 1/36; B64C 1/1461; B64C 1/18; F16J 15/14; F16J 15/022; F16J 15/104
See application file for complete search history.

(56) References Cited

U.S. PATENT DOCUMENTS

| | | |
|---|---|---|
| 4,152,479 A | 5/1979 | Larsen |
| 7,520,097 B2 | 4/2009 | Aalbers et al. |

(Continued)

FOREIGN PATENT DOCUMENTS

| | | |
|---|---|---|
| EP | 2685137 | 1/2014 |
| WO | 9525916 | 9/1995 |

(Continued)

OTHER PUBLICATIONS

Supplementary European Search Report, Application No. EP 14843364, 5 pages, dated May 3, 2017.

(Continued)

*Primary Examiner* — Gilbert Y Lee
(74) *Attorney, Agent, or Firm* — Jackson Walker, LLP

(57) ABSTRACT

Gaskets, including aircraft gaskets, are disclosed, the gaskets having an elastomeric gel body and substantially incompressible skeletons. The bodies may be pliable and deformable and, in one example, may be comprised of a two-part chemically cured polyurethane that sets up as a gel after mixing with the web so that it is fully integral with the web and so that there is substantially no air bubbles or air pockets left in the web. The web may be a regular shaped web and made of nylon.

41 Claims, 6 Drawing Sheets

(51) Int. Cl.
  *B64C 1/18*  (2006.01)
  *F16J 15/10*  (2006.01)

(56) References Cited

U.S. PATENT DOCUMENTS

| | | | | |
|---|---|---|---|---|
| 7,862,049 B2* | 1/2011 | Olson | ................... | F16J 15/122 |
| | | | | 277/650 |
| 8,691,033 B1 | 4/2014 | Busby et al. | | |
| 9,751,244 B2* | 9/2017 | Dry | ..................... | B29C 43/56 |
| 2002/0063397 A1* | 5/2002 | Gaines | .................. | H01Q 1/42 |
| | | | | 277/630 |
| 2003/0234498 A1* | 12/2003 | Busby | ..................... | B32B 27/04 |
| | | | | 277/651 |
| 2004/0041356 A1 | 3/2004 | Smith | | |
| 2004/0070156 A1 | 4/2004 | Smith | | |
| 2008/0280040 A1 | 11/2008 | Barrall et al. | | |
| 2010/0253012 A1 | 10/2010 | Zhuang et al. | | |
| 2013/0273342 A1 | 10/2013 | Johnson et al. | | |
| 2014/0015204 A1 | 1/2014 | Boyd et al. | | |
| 2014/0334868 A1 | 11/2014 | Apfel | | |
| 2015/0252903 A1* | 9/2015 | Boyd | ................... | F16J 15/061 |
| | | | | 244/119 |

FOREIGN PATENT DOCUMENTS

| | | |
|---|---|---|
| WO | 2010135249 | 11/2010 |
| WO | 2015168118 | 11/2015 |

OTHER PUBLICATIONS

Conwed Global Netting Solutions, Conwed Plastic netting 101, www.conwedplastics.com/en/about/plastic-netting-101, 6 pages Aug. 23, 2013.

Conwed Global Netting Solutions, Conwed Netting Characteristics, www.conwedplastics.com/en/about/plastic-netting-101/netting-characteristics, 8 pages Aug. 23, 2013.

Conwed Global Netting Solutions, Extruded Square Netting, 222.conwedplastics.com/en/core-products/extruded-netting/square, 5 pages Aug. 23, 2013.

Conwed Global Netting Solutions, How Is Cowed Plastic Netting Made?, www.conwedplastics.com/en/about/plastic-netting-101/netting-process, 5 pages Aug. 23, 2013.

Conwed Global Netting Solutions, Resins and Additives, www.conwedplastics.com/en/core-proucts/resins-additives, 7 pages Aug. 27, 2013.

* cited by examiner

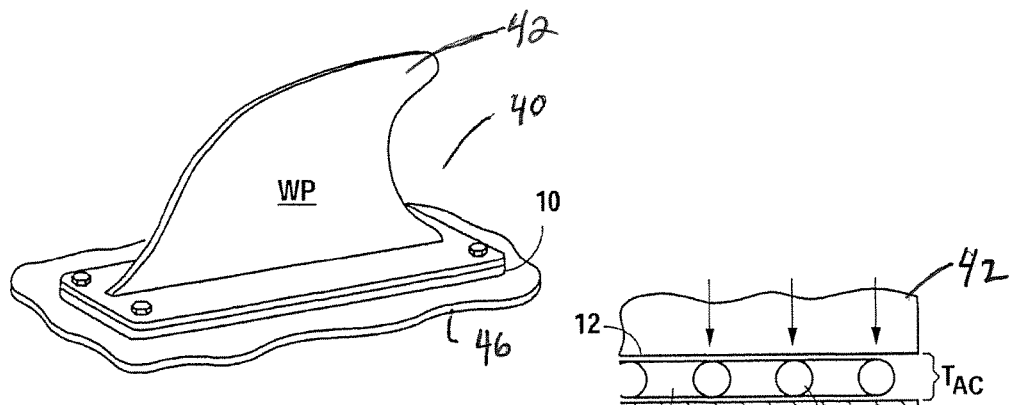
Fig. 4B
Fig. 4A
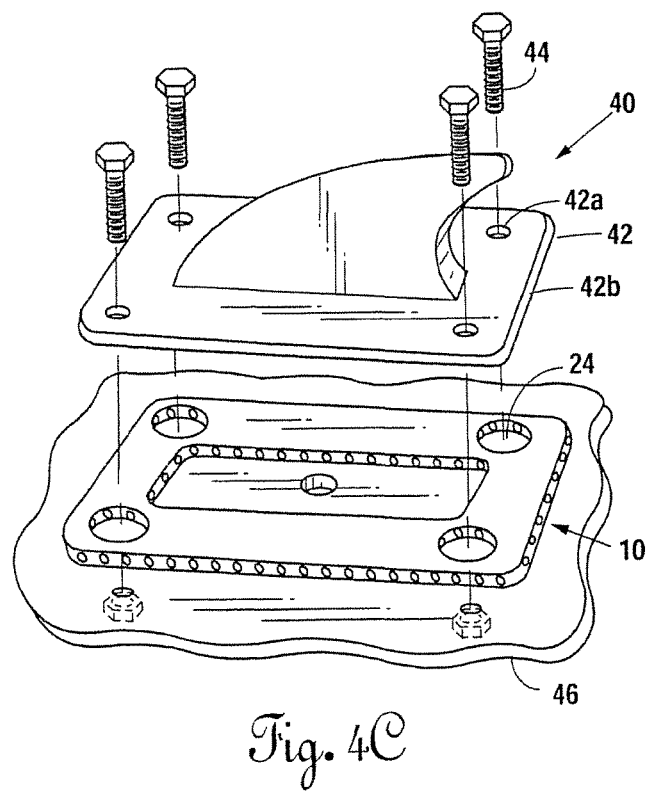
Fig. 4C

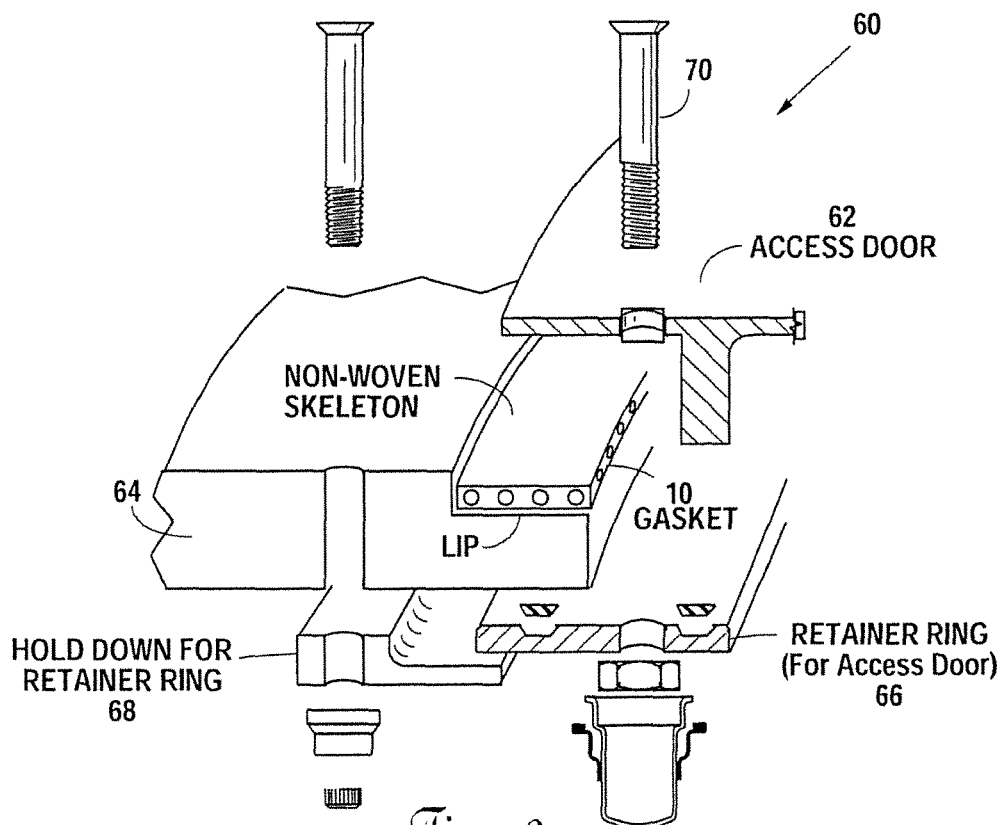
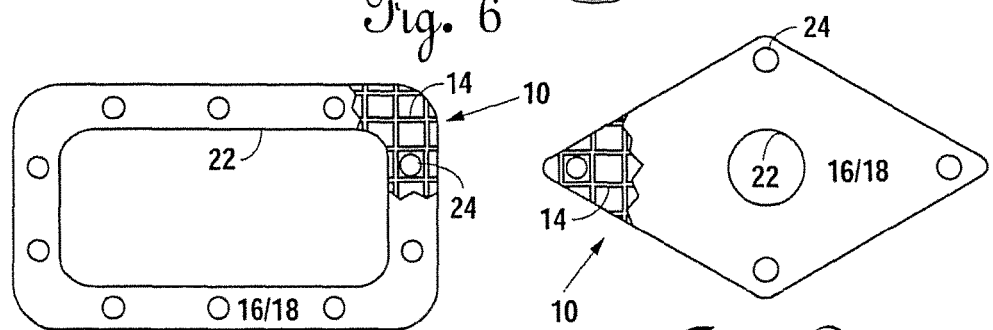
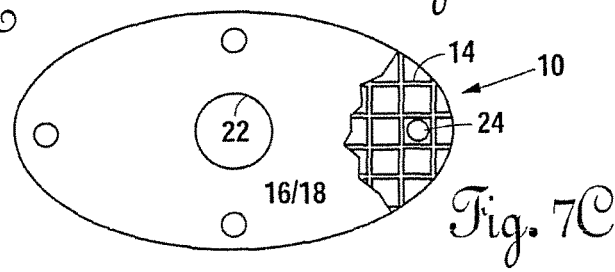

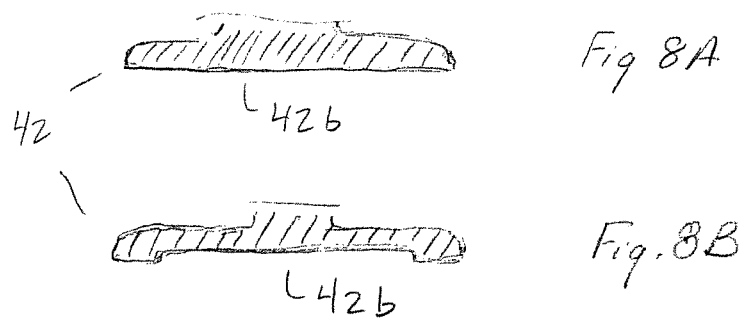

ELASTOMERIC GEL BODY GASKET HAVING A SUBSTANTIALLY INCOMPRESSIBLE SKELETON, A METHOD OF MAKING AND USING THE SAME

RELATED APPLICATIONS

This is a utility application that incorporates by reference and claims the benefit of U.S. Provisional Patent Application No. 61/876,849, filed Sep. 12, 2013.

FIELD OF THE INVENTION

Gaskets and gasket tape, including aircraft gaskets and gasket tape having elastomeric gel bodies and a substantially incompressible skeletons.

BACKGROUND OF THE INVENTION

Gaskets, including aircraft gaskets, are typically formulated for a specific set of criteria. While most gaskets have an environmental sealing function, the nature and extent of the sealing may be different in different applications. That is to say, gaskets, including aircraft gaskets, tend to be environment and assembly specific. What may be used as a gasket for interposition between an engine head and an engine block for an internal combustion engine would typically not be the same as the gasket for a gas meter, an air conditioner, or the speaker of a sound system, for example.

In some cases, it is typically desirable that a gasket be made from a material that, to some degree, yields under compression and provides a good environmental seal. A number of Applicant's products are directed to use in the field of aviation, more specifically, for use on aircraft bodies. These include the disclosures and specifications set forth in U.S. Patent Publication Nos. 2004/0070156 and 2004/0041356, and U.S. Pat. Nos. 6,530,577; 6,695,320; and 7,229,516, all of which are incorporated herein by reference.

Gaskets are typically provided for use under compression for sealing between two pieces of an aircraft. These pieces may include a moveable workpiece, such as an aircraft antenna, and an aircraft fuselage, the combination having a gasket at least partially therebetween with the gasket under compression between the antenna and the aircraft fuselage. An aircraft fuel access door may also be provided with a gasket under compression between the fuel access panel or door and a retainer assembly for the fuel access panel adapted to retain the fuel access panel against the fuselage of the aircraft. In another embodiment of Applicant's aircraft gaskets, aircraft floor panels are fastened under compression against stringers or floor mounting members with a gasket or gasket tape between the floor panels and the stringers. In most of these uses, compression is provided by suitably dimensioned fasteners, such as bolts and receiving nuts.

SUMMARY OF THE INVENTION

Applicant has discovered for certain applications that may desire reusability of the gasket and/or torque retention, a novel gasket with, in certain embodiments, a flexible (in two dimensions), but substantially incompressible (in thickness), non-knitted skeletal member for interposition at or between a top and bottom layer of a body of a generally tabular gasket shape. In some embodiments, Applicant has found that a combination of a novel skeletal member with a tacky gel body may provide for excellent compression set resistance and torque retention.

By compression set resistance, Applicant means that the gasket resists setting under compression, such that when compression is released, the gasket will rebound to approximately (or at least toward) its original thickness. For torque retention, Applicant refers to applying torque to fasteners between a workpiece and a base or body to which the workpiece attaches, which torque remains substantially unchanged (typically) even as time passes. This ability to retain settings in a non-metallic gasket close (about 60-90% of original value after about 20-45 min.) to the initial torque setting between a workpiece and a body or base with the gasket under compression saves the installer of the workpiece time.

A gasket or gasket tape is provided for interposition between a moveable aircraft workpiece and a stationary platform, the gasket comprising a pliable, elastomeric gel body having an upper surface, a lower surface, and a perimeter. A non-metallic, non-fibrous, electrically non-conductive, non-woven skeletal web is provided having an upper surface, a lower surface, a perimeter and a multiplicity of strands meeting at and integral with a multiplicity of joints, the strands and joints defining a multiplicity of open pores. The elastomeric gel body is typically the same size or thicker than and substantially encapsulates the skeletal web, including filling the pores thereof, and is integral therewith. The x and y dimensions of the skeletal web are typically much greater than the z (thickness) dimension. In one embodiment, there is only a single layer of skeletal web and gel between the upper and lower surfaces of the elastomeric gel body. The gasket is configured for lateral gel flow under compression between the workpiece and base, such compression in the range of about 50-500 psi, wherein such compression in some embodiments may cause contact with the skeletal web in the psi ranges indicated. For the gaskets tested, the pressure fails to cause substantial permanent deformation of the skeletal web. The yield limit was not reached.

The gasket or gasket tape typically has similar perimeters in size and shape to that of the workpiece. The surface of the gel body is tacky and may have hardness about 40-150 on 37.5 gr. half cone penetrometer. The skeletal web resists compression and exhibits structural and dimensional stability following compression of the gel body at the defined psi range. The skeletal web, in one example, is comprised of nylon. The non-woven skeletal web is typically about 40-60% open pore area. The thickness of the elastomer gel body may be between about 0.020 inches and 0.250 inches and the thickness of the skeletal web may be between about 0.010 inches and 0.125 inches.

The multiplicity of strands in the skeletal web include some strands in a machine direction and other strands in a cross direction, and the strands in the machine direction may be thicker than the strands in the cross direction. The joints may be thicker than any of the multiplicity of strands. The skeletal web may have a tensile strength of between about 10 MPa and 150 MPa. The joint may be square or rectangular in cross section or the joint may be substantially circular in cross section. The compression of the skeletal web is less than about five percent and, in some cases, the compression of the skeletal web is less than one percent. In one embodiment, the compression on the web fails to cause the skeletal web to exceed its elastic limit.

An assembly for use with an aircraft is provided, the assembly comprising an aircraft base, a workpiece for removably engaging the base; and a gasket or gasket tape for interposition between a moveable aircraft workpiece and a stationary platform. The gasket may comprise a pliable, elastomeric gel body having an upper surface, a lower surface, and a perimeter; and a non-metallic, non-fibrous, non-conductive, non-woven skeletal web having an upper surface, a lower surface, a perimeter and a multiplicity of strands meeting at and integral with a multiplicity of joints, the strands and joints defining a multiplicity of open pores. The elastomeric gel body may be the same size or thicker than and substantially encapsulates the skeletal web, including filling the pores thereof, and is integral therewith. The x and y dimensions of the gasket are typically much greater than the z (thickness) dimension. In one example, there is only a single layer of skeletal web and gel between the upper and lower surfaces of the elastomeric gel body and wherein the gasket is configured for lateral gel flow under compression between the workpiece and base, such compression in the range of about 50-500 psi, such compression fails to cause substantial permanent deformation of the web. The workpiece, in one example, is a fuel access door panel. The workpiece, in another, is an aircraft antenna. The workpiece, in another example, is an aircraft floor panel. The body and skeletal web have the same or similar properties as set forth in the foregoing paragraphs. The assemblies may further include a fillet seal at the edges.

A gasket or gasket tape for interposition between a removeable aircraft workpiece and a stationary platform, the gasket comprising a pliable, elastomeric gel body having an upper surface, a lower surface, and a perimeter; and a non-metallic, non-fibrous, electrically non-conductive, non-woven skeletal web having an upper surface, a lower surface, a perimeter, and a multiplicity of strands meeting at and integral with a multiplicity of joints, the strands and joints defining a multiplicity of open pores. The elastomeric gel body is at least the same size as and substantially encapsulates the skeletal web, including filling the pores thereof, and is integral therewith. The x and y dimensions are much greater than the z (thickness) dimension; and there may be only a single layer of skeletal web and gel between the upper and lower surfaces of the elastomeric gel body. The gasket may be configured for lateral gel flow under compression in the range of about 50-500 psi, such compression fails to cause substantial compression of the web.

A gasket or gasket tape for interposition between a removeable aircraft workpiece and a stationary platform, the gasket comprising a pliable, elastomeric polyurethane gel body having an upper surface, a lower surface, and a perimeter; and a non-metallic, non-fibrous, electrically non-conductive, non-woven skeletal web having an upper surface, a lower surface, a perimeter, and a multiplicity of strands meeting at and integral with a multiplicity of joints. The strands and joints may define a multiplicity of open pores. The elastomeric gel body is typically at least the same size as and substantially encapsulates the skeletal web, including filling the pores thereof, and is integral therewith. The x and y dimensions are usually much greater than the z (thickness) dimension. There may be only a single layer of skeletal web and gel between the upper and lower surfaces of the elastomeric gel body. The gasket is configured for lateral gel flow under compression in the range of about 50-500 psi, such compression fails to cause the skeletal web to exceed its elastic limit.

BRIEF DESCRIPTION OF THE DRAWINGS

FIGS. 4A, 4B, and 4C are various views of an aircraft assembly for which Applicant's gasket may be used.

FIG. 6 is a fuel access panel assembly that may be used with Applicant's gasket or gasket tape.

FIGS. 7A, 7B, and 7C are top/bottom plan views of three different possible gasket configurations for the embodiments of Applicant's gaskets disclosed herein.

FIGS. 8A and 8B are cross-sectional views as a full contact base and a hollowed out base for an aircraft antenna.

DETAILED DESCRIPTION OF THE ILLUSTRATED EMBODIMENTS

Figure 1:
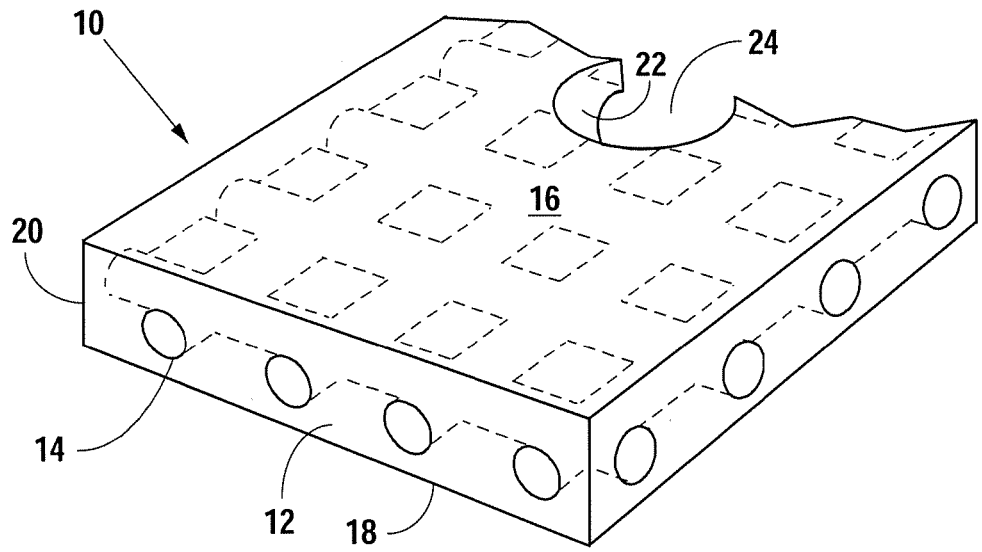
FIG. 1 is a perspective view of a part of a gasket with some features of Applicant's disclosure.
Figure 1A:
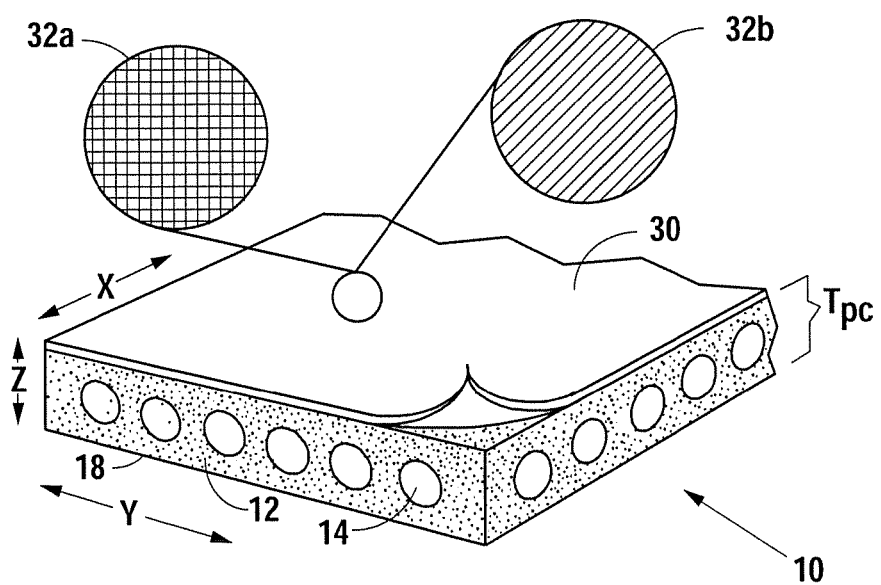
FIG. 1A is a perspective view of an embodiment of Applicant's gasket with a skin engaged thereto.
Figure 2:
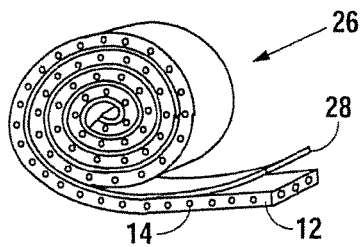
FIG. 2 is a perspective view of a gasket tape or tape with some features of Applicant's disclosure.

The various gaskets and tape of the instant disclosure may be used for numerous applications on an aircraft and, in some embodiments, a railroad car, a ship or other waterborne vessels. The aircraft uses include, but are not limited to: fuel access door gaskets, aircraft floor panel gaskets, and aircraft antenna gaskets.

This specification relates to a gasket 10 or a gasket tape 26, both comprising a body 12 and a web skeleton 14 as seen in FIGS. 1, 1A, 2, 3A, 3B, and 3C. Body 12 is typically sheet-like, typically x and y>>z, and web skeleton 14 is typically bendable along its x, y axes, substantially incompressible along a Z axis, non-fibrous, non-conductive, and non-woven. Body 12 may have a tacky top surface 16 and a spaced apart, tacky bottom surface 18. Gasket 10 may include outer perimeter or walls 20 and inner perimeter or walls 22 defining a generally sheet-like composite, which may include fastener holes 24. In one embodiment, skin 30 may be interposed on one or both sides of the body, which skin 30 may be intended to be part of the gasket, that is to say, is intended to be under compression between a platform and a workpiece. A release film 28 may be provided for adherence to the top 16 and/or bottom 18 surfaces, which release film prevents the tacky surfaces from inadvertently adhering to objects prior to removal. Release film 28 is intended for removal prior to use between a workpiece and a platform, that is to say, for interposing the gasket between mating surfaces.

Web Skeleton

Applicant's web skeleton 14 may be non-woven (non-knitted), non-electrically conductive, non-fibrous, and substantially incompressible in the typical PSI and torque ranges set forth herein. Applicant provides for a gasket with excellent sealing characteristics and compression set resistance and torque retention properties, which may be substantially resistant to plastic deformation and resulting compression set. In particular embodiments, Applicant provides a web skeleton with multiple open pores defined by monofilament strands 34 joined at integral joints 36. In certain embodiments, Applicant's skeletal carrier is a web skeleton with voids or open pore space in the range of about 20 to 80% of preferably about 40-60% of the web area (top view) and is flexible, but non-crushable in the PSI and torque ranges set forth herein, and, in many embodiments, substantially non-stretchable in the x, y plane. In some embodiments, the gasket or tape edges may comprise open voids.

Figure 3A:
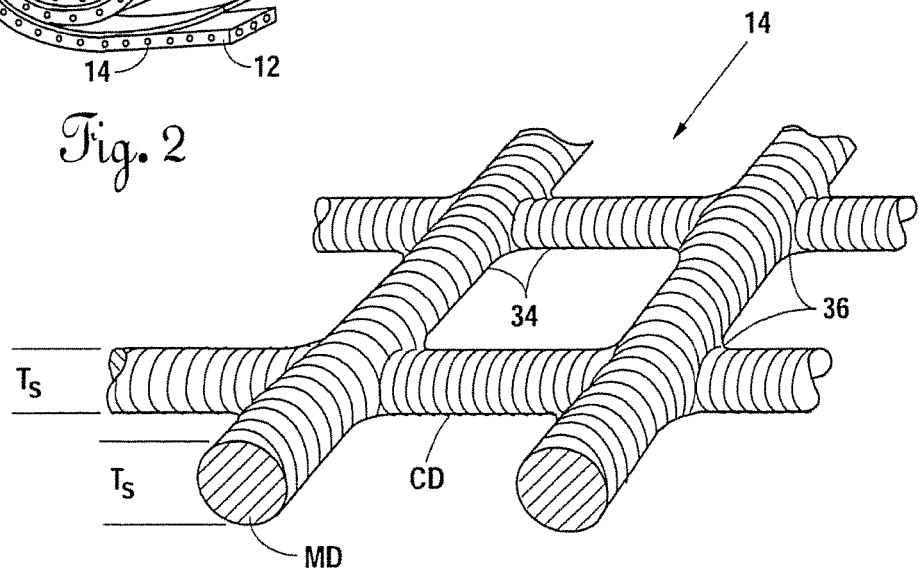
FIGS. 3A, 3B, 3C, and 3D are perspective views of various web configurations for use with Applicant's gasket or tape.
Figure 3C:
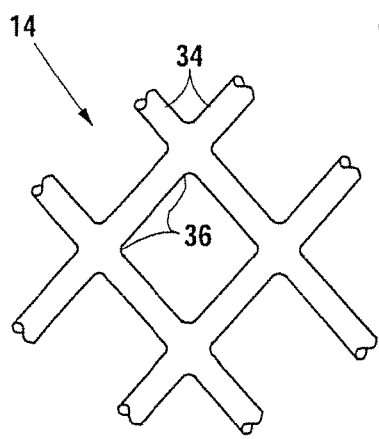
Figure 3B:
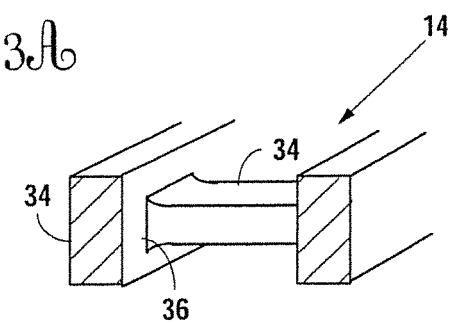
Figure 3D:
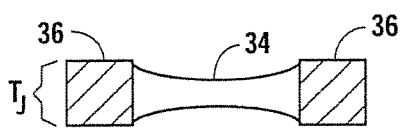

Applicant's carrier or web skeleton 14 may be comprised of multiple linear strands 34, which join at joints 36. The joints and strands may define at non-edge portions of gasket 10 enclosed pores 38, which may be square, rectangular, diamond shaped or other suitable shape. Strands 34 may be in cross-section round, rectangular, square or any other suitable shape (see FIGS. 3A-3C). Strands 34 may be thinner, in some embodiments, at non-joint regions, such as midpoint between the joints (see FIG. 3D).

Strands may be non-metallic and made by an extrusion process, such as that used by Conwed Plastics (www.conwedplastics.com), which discloses a known method of manufacturing non-knitted plastic netting, which results in a non-knitted netting, and which may use different resins including, in one embodiment, an aliphatic polyamide (for example, nylon), and formulations with varying properties as a raw material. In certain embodiments, Conwed extruded netting is used, which in some embodiments is manufactured through a single step continuous extrusion process that yields a plastic material with integral joints. This is a melt processing of thermoplastics into netting. An extruder melts and pressurizes plastic pellets and forces them through a tooling and a die to create a netting profile. After the plastic moves through the die and is cooled, the plastic hardens into a predetermined shape. These may be square, diamond. and flat netting. Among the methods of manufacturing the webbing are any of the methods of manufacturing set forth in Conwed, U.S. Pat. No. 4,152,479, incorporated herein by reference. Extruded webbing, such as Conwed extruded webbing, may be oriented after extrusion to provide a machine direction and a cross (transverse) direction to the strands of the netting.

Mesh size is the distance of the center of one strand to the center of the next strand in that direction. Hole size is the distance from the strand's inner edge to the next strand's inner edge in that direction. Both measurements are typically reported in inches, millimeters, centimeters, and may be specified for both machine and cross (transverse) directions. Strand count is the number of strands observed in a given length in that direction, and is typically reported in "strands per inch." In one embodiment of Applicant's gasket or gasket tape, the web skeleton has a strand count of about 16 per 1" in both MD and CD.

Netting thickness can also be referred to as height, the thickness may be provided in some embodiments with joints that are thicker than the strands and, in other embodiments, where joints are about the same thickness as the strands. An integral joint means that strands where they meet at the joint are not separate or separable, and are typically not identifiable as individual strands at the joint. This is in contradistinction to a woven fabric or knitted skeletal member, such as some of those disclosed in the Applicant's publications and patents as incorporated herein by reference.

At about 200 psi or in the typical PSI range set forth herein, the elastic limit (or at least the yield point) of the plastic or nylon that, in certain embodiments, comprises the composition of the web skeleton in a direction perpendicular to the plane of the net is not achieved. These ranges are provided for the web skeleton in the gasket. Those compression ranges are as follows. In one embodiment, the compression range is between about 150-300 psi and, in another embodiment, about 50-500 psi and, in another embodiment, up to about 800 psi. At these ranges, torque values for fasteners x,y may be between about 10 in. lbs. about 100 in. lbs (depending on area, and number and size of fasteners) on, for example, aircraft antenna gaskets.

re-torque (on slightly curved fixtures) test was performed and the results for the identified gaskets specifications are as follows:

| Antenna | Polyurethane | Carrier | Thickness (inches) Entire Gasket (Skeletal) | Undercut (inches) | Washers | Torque (in lbs) | Time (hours) | Breakaway Torque (in lbs) |
|---|---|---|---|---|---|---|---|---|
| GPS | AVDEC PLUM | Woven fiberglass | 0.045 (.013) | 0 | No | 35 | 24 | 6.5 |
| GPS | AVDEC PLUM | Conwed non-woven Nylon | 0.035 (.028) | 0 | No | 35 | 24 | 23 |
| GPS | AVDEC PLUM | Conwed non-woven Nylon | 0.045 (.028) | 0 | No | 35 | 24 | 10.5 |
| Radio Altimeter | AVDEC PLUM | Woven fiberglass | 0.045 (.013) | 0 | No | 35 | 24 | 10 |
| Radio Altimeter | AVDEC PLUM | Conwed non-woven Nylon | 0.035 (.028) | 0 | No | 35 | 24 | 24.5 |
| Radio Altimeter | AVDEC PLUM | Conwed non-woven Nylon | 0.045 (.028) | 0 | No | 35 | 24 | 15.5 |

As can be seen, embodiments that used a non-woven nylon web required significantly more torque to uncouple the attachment bolts. Thus, the gaskets in these embodiments was applying significant force to the bolts to inhibit their removal. This quality provides a more effective long term seal versus traditional gaskets.

While not being constrained by theory, it is believed that, in the embodiment shown, the non-woven, integral joint web skeleton when incorporated into the body is capable of compression in these ranges without reaching its yield point (or possibly its elastic limit) and thus undergoing permanent plastic deformation.

Moreover, in the preferred embodiments of the gasket, the web skeleton retains its length and width dimensions without or with little expansion laterally within the x,y plane of the skeleton while being compressed between the mating faces of the workpiece and platform under the indicated PSI ranges. That is to say, in the X and Y axis, the web skeleton is dimensionally stable, while there is typically squeeze out of the material, such as elastomer gel, comprising body 12. In one embodiment, the maximum thickness of the web skeleton TJ thickness (thickness joint) is in the range of about 15 to 40 mil, and in a most preferred embodiment, about 26 to 32 mil. The thickness of the joints and the thickness of the strands may differ and in one embodiment thickness of the joints may be greater than thickness of the strands TS. Thickness of the strands may differ and, in one direction, such as machine direction, be thicker than in the cross direction (see FIG. 3A).

Body

In a preferred embodiment, the body is an elastomer, such as an elastomer gel. A suitable elastomer gel may be a two component polyurethane or polyurea or have the properties of the polyurethane gels disclosed in the AVDEC patent publications incorporated by reference herein. Gels may have a surface tackiness, have high elongation properties, low modulus, and debone cleanly from most materials, including aluminum. Gasket 10 and gasket tape 26 may be made according to the methods set forth in the AVDEC publications provided, however, that web skeleton 14 may be positioned anywhere in the body, including on or at the top surface, on or at the bottom surface or anywhere in between. As seen with reference to the Figures, the body material is integral with the web skeleton, so as to work its way through the open pores 38 in the skeleton, and to work its way around the strands and joints so as to substantially avoid air pockets. In a preferred embodiment, the gel is a polyurethane elastomeric gel, which is mixed in two parts (polyol and isocynate) for curing after application onto the web skeleton in place in a manner which sets to substantially encapsulate the web skeleton therein. The two parts may be mixed immediately prior to contact with the flat laying skeleton, as seen in the AVDEC patents.

While the foregoing has set forth certain details of the gasket, gasket body, skeleton, shape, physical and chemical properties, the following will set forth there specific uses of the gasket or gasket tape in an aircraft environment.

FIGS. 4A-4C illustrate an aircraft antenna assembly 40. Aircraft antenna assembly 40 may comprise an aircraft antenna 42, such as those affixed to the surface of the fuselage of an aircraft and connected to the electronics of the aircraft for transmission and receipt of electromagnetic signals to and from a remote source. The aircraft antenna 42 of the aircraft antenna assembly typically has a base 42b (full plate as seen in FIG. 8A or hollowed out as seen in FIG. 8B) with fastener holes 42a therethrough and may engage, through fasteners or the like, the fasteners 44 or the like, a fuselage 46 of an aircraft (washers may or may not be used). The base of the antenna may have a flat or slightly curved underside and the portion of the fuselage matches the flatness or curveness of the tabular base, so that the surfaces are relatively smooth and matching.

A gasket 10, according to the teachings of this application, may be interposed between the opposed faces of the antenna and the fuselage. In one embodiment, the fasteners are torqued to a range of about 10 to 70 in. lbs., in one embodiment, providing a PSI range of about 50 to 300 (preferably about 200 psi). Compression provided to gasket 10 will typically cause squeeze out and compression of body 12, until the top and bottom surfaces of web skeleton 16 make contact with (or come close to) the underside of the antenna and the top side of the fuselage. At this point, in certain embodiments, web skeleton 14 typically provides a mechanical stop to the compression in the PSI ranges set forth. In one embodiment, the thickness of gasket 10 has a pre-compression thickness Tpc of about 30 to 70 mil (preferably about 45 mil) and a thickness after compression Tac of about 30 mil or in the range of 15 to 40 mil. In some embodiments, post compression thickness of the skeleton, measured while still under compression, is at least 90% of non-compressed, in others is at least 95% of non-compressed, in others at least 97%, and still others is at least 99% of the non-compressed thickness. In one embodiment, the pre-compression thickness of the body is about 0.003 to 0.013" greater than the skeleton; in another, about 0.008" or less.

Figure 5:
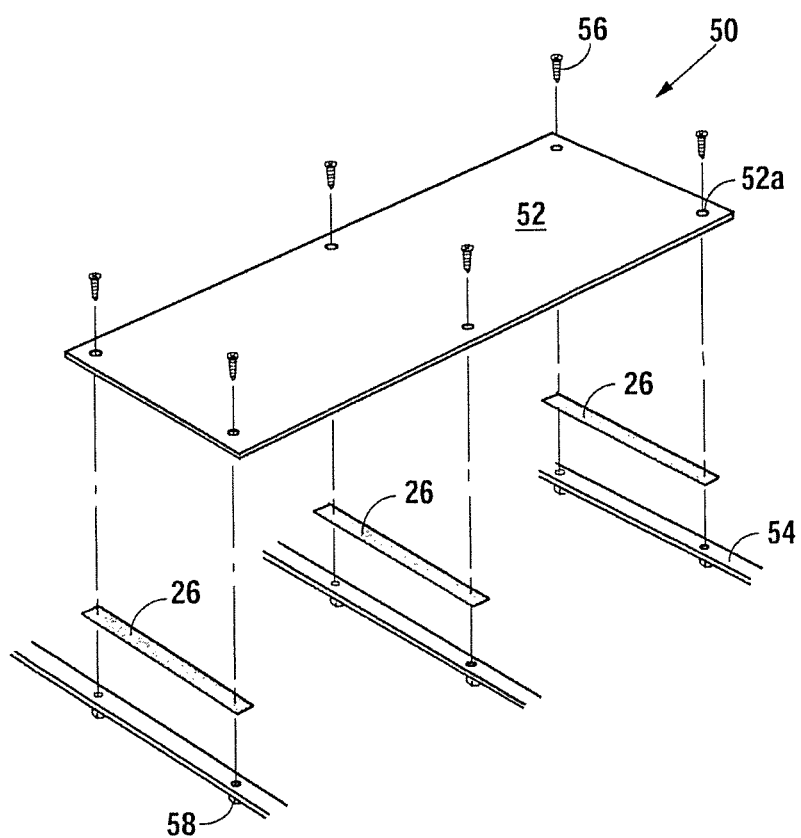
FIG. 5 is a perspective exploded view of a aircraft floor panel assembly that may use Applicant's gasket or gasket tape.

FIG. 5 illustrates a floor panel assembly 50 which, in one embodiment, may comprise a multiplicity of floor panels 52 (one shown), which may have a multiplicity of fastener holes 52a therein. Floor panels 52 are configured to removably engage a multiplicity of typically parallel or grid lined floor panel support stringers 54. Fasteners 56 and fastener receiving elements, such as nuts or blind nuts 58, are adapted to hold the floor panels against the stringers with lengths of gasket tape 26 therebetween. Gasket tape 26 may be provided in the floor panel assembly with or without a smooth, tough skin 30. Skin 30 may be, in one embodiment, a semi-porous woven fabric 32 (such as fiberglass), to allow seepage of some of the gel body therethrough. In another embodiment, skin 30 is impervious 32b and may be made of Teflon or PTFE or other suitable substance. Such an impervious skin will present a substantial barrier to the passage of moisture therethrough and add mechanical integrity to the body. Skin 30 may add about 5 mil to the gasket thickness.

One function of the skeleton is to provide shape and integrity to the body of the gasket, among other things. Here, it also in some embodiments provides a mechanical stop and compression set resistance when the floor panels are engaged with the support stringers in the PSI ranges indicated.

Fuel access doors or panels are provided, typically on the exterior of aircraft. Removal of fuel access door provides access to the fuel tank of the aircraft. Fuel access doors are typically configured to removable receipt onto the skin or fuselage of an aircraft through the use of a retainer ring and a retainer hold down ring as known in the art.

One particular application of Applicant's novel gasket 10 or gasket tape 26 is use in a fuel access door assembly 60, such as that illustrated in FIG. 6. Fuel access door assembly may include fuel access door or panel 62, that is adapted to be removably received against the fuselage or skin 64 of an aircraft exterior. Retainer ring 66 is provided with retainer hold down ring 68. A multiplicity of fasteners 70 usually are provided to hold the fuel access door 60 against a gasket, here, Applicant's novel gasket 10, which in turn lays against the upper surface or lip of the fuselage or skin 64 as seen in FIG. 6.

In the three embodiments illustrated, gasket 10 typically has a polyurethane gel body with good environmental sealing characteristics, which may flow or deform under the pressure ranges set forth herein. Mating surfaces of the workpiece and base tend to be flat or slightly curved, but with occasional minor imperfections in the smoothness of the surface. Use of Applicant's body 12 provides good adherence and environmental sealing. Web skeleton 14 may provide a substantial mechanical stop and, under the pressure ranges indicated, provides substantial incompressibility and/or compression set resistance and the possibility of reuse of the gasket. In some cases, the body maintains sufficient tackiness so that one or both compressive surfaces may be removed and web skeleton is seen to have accepted the pressures in the pressure ranges without any substantial compression set. Moreover, the dimensional stability, especially in the x-y plane, maintains its structural integrity and does not show substantial compression set deformation upon removal from between the mating surfaces after days and months of use. Compression set deformation may be less than 5% in some embodiments, less than 3% in some embodiments, and less than 1% in some embodiments. Thus, workpieces, such as antennas, floorboards, and fuel access doors, may be reattached to a tacky gasket body and re-torqued, retaining good environmental sealing and compression set resistance.

Applicant has observed the appearance, structure, integrity, and stretch of woven and unwoven gaskets, including the Conwed nylon gasket, after removal between mating surfaces following a prolonged period of compression. The Conwed nylon web under similar circumstances with the same polyurethane gel body was without visible loss of structural integrity or any observable dimensional stretch in the x,y plane. It was likely less than about 5% and less than about 3% stretch in the x,y plane or in compression (thickness), and in one embodiment, compression of less than 1% (in thickness) following compression in the range of about 50 psi to 500 psi. It was simply not observable to the naked eye that there was any change in the x,y dimensions nor thickness of the gasket when upon compression the torque or psi ranges were achieved.

Substantial incompressibility means, within the psi range limits of about 50 to about 500 psi, that after the psi has been applied to the gasket, a thickness measurement of the web (still under compression) finds that, in one case, there is less than about 5% reduction in thickness and, in a second case, less than about 3% and, in a third case, less than about 1% thickness reduction. In another embodiment, Applicant's gasket may undergo compression, before or up to its elastic limit, and in another case, between its elastic limit and its yield limit.

Nylon and suitable web or net equivalents, including Kevlar, have mechanical, chemical, and physical properties that Applicant has discovered suitable for specific uses, including for a sticky gasket or tape on an aircraft. These properties include: absorbs very little moisture, which allows the material to retain a high degree of dimensional stability; retains excellent impact and non-impact strengths even at temperatures below freezing; excellent resistance to chemicals, including hydraulic fluids, oils, grease, saltwater; exceptionally strong resistance to cracking under stress; excellent abrasion resistance; low coefficient of friction; dampens noise and vibration; fatigue resistance and, when formed as a web, flexible, but substantially non-compressible. In particular implementations, the material may have a hardness range of great then 100 Rockwell.

Among the netting or web configurations that Applicant's webbing may take are square net; flat net (extruded and oriented square netting configuration with flat joints in uniform thickness); diamond net (extruded netting with diamond shaped kpore configuration); or multi-layer co-extrusion where different polymers conform different layers on the same net configuration. In one embodiment, Applicant's web is comprised of a long chain thermoplastic polymer and, in another embodiment, the polymer is a long chain polyamide, in one example, nylon.

description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. A gasket or gasket tape for interposition between a moveable aircraft workpiece and a stationary platform, the gasket comprising:
a pliable, elastomeric gel body having an upper surface, a lower surface, and a perimeter; and
a non-metallic, non-fibrous, electrically non-conductive, non-woven skeletal web having an upper surface, a lower surface, a perimeter and a multiplicity of strands meeting at and integral with a multiplicity of joints, the strands and joints defining a repeated pattern with a multiplicity of open pores;
wherein the elastomeric gel body is the same size or thicker than and substantially encapsulates the skeletal web, including filling the pores thereof, and is integral therewith; and
wherein the x and y dimensions are much greater than the z (thickness) dimension; and
wherein there is only a single layer of skeletal web and gel between the upper and lower surfaces of the elastomeric gel body and wherein the gasket is configured for
lateral gel flow when said elastomeric body is under compression between the workpiece and base, such compression in the range of about 50-500 psi, wherein such compression fails to cause substantial permanent deformation of the thickness of the skeletal web.

2. The gasket or gasket tape of claim 1, wherein the body and skeletal web have similar perimeters in size and shape to that of the workpiece.

3. The gasket or gasket tape of claim 1, wherein the body is a tacky polyurethane gel and has a hardness between about 40-150 on 37.5 gr. half cone penetrometer.

4. The gasket or gasket tape of claim 1, wherein the skeletal web resists compression and exhibits structural and dimensional stability following compression of the elastomeric gel body at the stated psi range.

5. The gasket or gasket tape of claim 1, wherein the skeletal web is comprised of nylon.

6. The gasket or gasket tape of claim 1, wherein the non-woven skeletal web is about 40-60% open pore area.

7. The gasket or gasket tape of claim 1, wherein the thickness of the elastomer gel body is between about 0.020 inches and 0.250 inches, and the thickness of the skeletal web is between about 0.010 inches and 0.125 inches.

8. The gasket or gasket tape of claim 1, wherein the multiplicity of strands include some strands in a machine direction and other strands in a cross direction, and the strands in the machine direction are thicker than the strands in the cross direction.

9. The gasket or gasket tape of claim 1, wherein the joints are thicker than any of the multiplicity of strands.

10. The gasket or gasket tape of claim 1, wherein the skeletal web has a tensile strength of between about 10 MPa and 150 MPa.

11. The gasket or gasket tape of claim 1, wherein the joint is square or rectangular in cross section.

12. The gasket or gasket tape of claim 1, wherein the joint is substantially circular in cross section.

13. The gasket or gasket tape of claim 1, wherein the compression of the skeletal web is less than about five percent in thickness.

14. The gasket or gasket tape of claim 1, wherein the compression of the skeletal web is less than about one percent in thickness.

15. The gasket or gasket tape of claim 1, wherein the compression of the gasket fails to cause the skeletal web to exceed its elastic limit.

16. A gasket or gasket tape for interposition between a moveable aircraft workpiece and a stationary platform, the gasket comprising:
a pliable, elastomeric gel body having an upper surface, a lower surface, and a perimeter; and
a non-metallic, non-fibrous, electrically non-conductive, non-woven skeletal web having an upper surface, a lower surface, a perimeter, and a multiplicity of strands meeting at and integral with a multiplicity of joints, the strands and joints defining a repeated pattern with a multiplicity of open pores;

wherein the elastomeric gel body is at least the same size as and substantially encapsulates the skeletal web, including filling the pores thereof, and is integral therewith;

wherein the x and y dimensions are much greater than the z (thickness) dimension; and wherein there is only a single layer of skeletal web and gel between the upper and lower surfaces of the elastomeric gel body and wherein the gasket is configured for lateral gel flow when the elastomeric body is under compression in the range of about 50-500 psi, wherein such compression fails to cause substantial compression of the thickness of the web.

17. The gasket or gasket tape of claim 16, wherein the body is a tacky polyurethane gel and has a hardness about 40-150 on cone penetrometer.

18. The gasket or gasket tape of claim 16, wherein the skeletal web resists compression and exhibits structural and dimensional stability following compression of the elastomeric gel body at the stated psi range.

19. The gasket or gasket tape of claim 16, wherein the skeletal web is comprised of nylon.

20. The gasket or gasket tape of claim 16, wherein the thickness of the elastomer gel body is between 0.020 inches and 0.250 inches, and the thickness of the skeletal web is between 0.010 inches and 0.125 inches.

21. The gasket or gasket tape of claim 16, wherein the multiplicity of strands include some strands in a machine direction and other strands in a cross direction, and the strands in the machine direction are thicker than the strands in the cross direction.

22. The gasket or gasket tape of claim 16, wherein the joints are thicker than any of the multiplicity of strands.

23. The gasket or gasket tape of claim 16, wherein the skeletal web has a tensile strength of between 10 MPa and 150 MPa.

24. The gasket or gasket tape of claim 16, wherein the joint is square in cross section.

25. The gasket or gasket tape of claim 16, wherein the compression causes no compression set of the skeletal web in thickness.

26. The gasket or gasket tape of claim 16, wherein the compression of the skeletal web is less than about five percent in thickness.

27. The gasket or gasket tape of claim 16, wherein the compression of the skeletal web is less than about one percent in thickness.

28. The gasket or gasket tape of claim 16, wherein the compression of the skeletal web fails to cause substantial permanent deformation of the skeletal web in thickness.

29. The gasket or gasket tape of claim 16, wherein the compression of the skeletal web fails to cause the skeletal web to exceed its elastic limit.

30. A gasket or gasket tape for interposition between a moveable aircraft workpiece and a stationary platform, the gasket comprising:

a pliable, elastomeric gel body having an upper surface, a lower surface, and a perimeter; and a non-metallic, non-fibrous, electrically non-conductive, non-woven skeletal web having an upper surface, a lower surface, a perimeter, and a multiplicity of strands meeting at and integral with a multiplicity of joints, the strands and joints defining repeated pattern with a multiplicity of open pores;

wherein the elastomeric gel body is at least the same size as and substantially encapsulates the skeletal web, including filling the pores thereof, and is integral therewith;

wherein the x and y dimensions are much greater than the z (thickness) dimension; and wherein there is only a single layer of skeletal web and gel between the upper and lower surfaces of the elastomeric gel body and wherein the gasket is configured for lateral gel flow when said elastomeric body is under compression in the range of about 50-500 psi, wherein such compression fails to cause the skeletal web to exceed its elastic limit.

31. The gasket or gasket tape of claim 30, wherein the surface of the body is tacky and has a hardness about 40-150 on cone penetrometer and comprises polyurethane gel.

32. The gasket or gasket tape of claim 30, wherein the skeletal web resists compression and exhibits structural and dimensional stability following compression of the elastomeric gel body at the defined psi range.

33. The gasket or gasket tape of claim 30, wherein the skeletal web is comprised of nylon.

34. The gasket or gasket tape of claim 30, wherein the thickness of the elastomer gel body is between 0.020 inches and 0.250 inches, and the thickness of the skeleton is between 0.010 inches and 0.125 inches.

35. The gasket or gasket tape of claim 30, wherein the multiplicity of strands include some strands in a machine direction and other strands in a cross direction, and the strands in the machine direction are thicker than the strands in the cross direction.

36. The gasket or gasket tape of claim 30, wherein the joints are thicker than any of the multiplicity of strands.

37. The gasket or gasket tape of claim 30, wherein the web has a tensile strength of between 10 MPa and 150 MPa.

38. The gasket or gasket tape of claim 30, wherein the joint is square in cross section.

39. The gasket or gasket tape of claim 30, wherein the compression of the body causes no compression set of the skeletal web in thickness.

40. The gasket or gasket tape of claim 30, wherein the compression of the skeletal web is less than five percent in thickness.

41. The gasket or gasket tape of claim 30, wherein the compression of the skeletal web is less than one percent in thickness.

\* \* \* \* \*